UNITED STATES PATENT OFFICE.

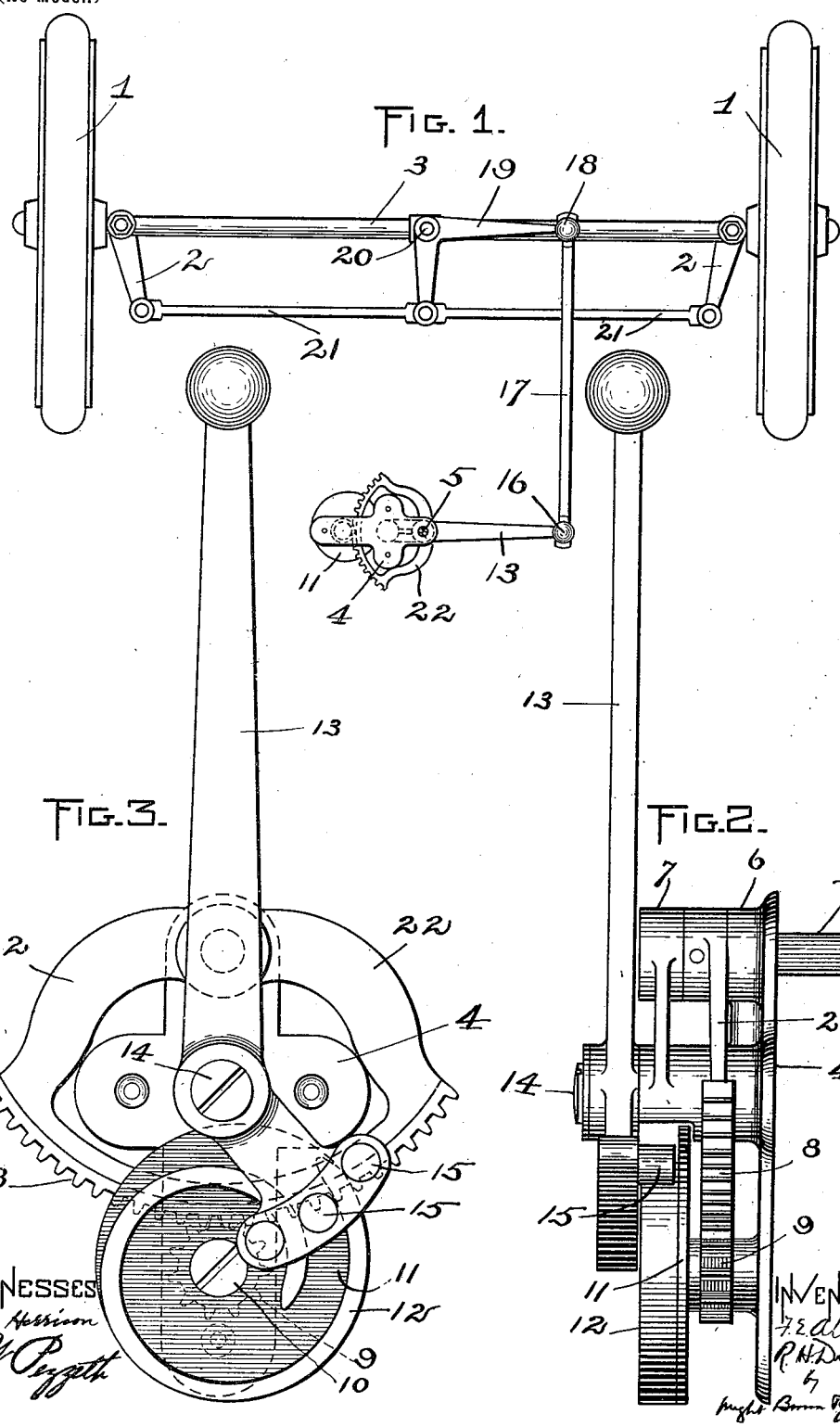

FREDERICK E. ALLEN, OF BOSTON, AND RAYMOND H. DANFORTH, OF SALEM, MASSACHUSETTS, ASSIGNORS TO THE IMPROVEMENTS MANUFACTURING COMPANY, OF BOSTON, MASSACHUSETTS.

STEERING MECHANISM.

SPECIFICATION forming part of Letters Patent No. 663,381, dated December 4, 1900.

Application filed July 20, 1900. Serial No. 24,256. (No model.)

*To all whom it may concern:*

Be it known that we, FREDERICK E. ALLEN, of Boston, in the county of Suffolk, and RAYMOND H. DANFORTH, of Salem, in the county of Essex, State of Massachusetts, have invented certain new and useful Improvements in Steering Mechanisms, of which the following is a specification.

This invention relates to steering mechanism of the non-reversing or locked type adapted to be applied to automobiles or other vehicles or to vessels.

The objects of the invention are to simplify and cheapen the steering mechanism and render it more light and compact.

The invention consists in the improvements which we will now proceed to describe and claim.

Of the accompanying drawings, Figure 1 represents a plan view of the steering arrangements of an automobile to which our invention is applied. Fig. 2 represents a side elevation of the steering mechanism. Fig. 3 represents a reverse plan view of said mechanism.

The same reference characters indicate the same parts in all the figures.

Referring to the drawings, 1 1 represent the steering-wheels of an automobile vehicle, the same being mounted upon knuckles or steering-spindles 2 2, which are journaled at the ends of a cross-frame or axle 3.

4 represents a base-plate adapted to be attached to the body of the vehicle, the cross-frame 3, or any other relatively-fixed support. The said base in the arrangement shown in Fig. 1 would be attached to the vehicle-body.

5 is a stem or spindle journaled in bearings 6 7 on the base-plate 4 and adapted to be connected at its upper end with the steering lever, wheel, or other handle, which is grasped by the steersman.

8 is a spur-gear segment keyed to the spindle 5, and 9 is a spur-pinion meshing with said segment and journaled on a stud 10 on the base-plate.

11 is a flat cam attached to the pinion 9 and having on its under face a spiral or scroll thread 12.

13 is an oscillatory arm pivoted on a stud 14 on the base-plate 4 and having a series of studs or teeth 15 15 projecting from it at a distance from the pivot 14 and engaged by the thread 12 of the cam. The lever 13 is connected at its outer end by a universal joint 16 with a link or rod 17, attached at its other end by a universal joint 18 with one arm of a bell-crank or bent lever 19, which is pivoted at 20 to the cross-frame 3. The other arm of said lever 19 is connected by links 21 21 with the steering-knuckles 2 2. In case the base 4 were attached to the cross-frame 3 the lever 13 would take the place of the lever 19.

The gear-segment 8 is of considerably larger radius than the pinion 9, so that when the pintle 5 is rotated through a relatively small arc one or more complete revolutions will be given to the cam 12. The thread of said cam, acting on the teeth 15 of lever 13, will oscillate said lever on its pivot, which oscillatory movement will be transmitted by the described connections to the steering-wheels, causing the latter to turn in one direction or the other and guide the vehicle. The arc of movement of the teeth 15 is very nearly normal to the thread 12, and the lever 13 is accordingly locked when the cam 11 is stationary, thereby locking the steering-wheels and preventing them from reversing or twisting out of their course, due to irregularities in the road. The perimeter of the segment 8 is attached by two arms 22 22 with the hub of said segment, and the inner edges of these arms act as stops which coöperate with the base of the stud 14, on which the lever 13 is pivoted, in limiting the movement of the segment, and hence of the steering-wheels, in either direction.

We do not confine our invention to the steering of automobile vehicles. The construction described is applicable, without substantial modification, to the rudder of a boat.

We are aware that prior to our invention it has been proposed to employ a worm rotated by multiplying gearing from the steering-spindle and acting upon a member equivalent to the oscillatory lever 13, whereby a locking action is obtained which prevents the reversal or twisting of the steering-wheels by obstructions in the road. The flat cam, however, which we employ has these advantages over a worm: It can be made smaller and lighter for an equivalent throw or travel of the lever 13, due to a given amount of rotation. It can be made in cast form with much less backlash than is present with a cast worm. The mechanism in which it is embodied may be made much more compact than a worm mechanism, since the multiplying-gear, the flat cam, and the lever oscillated by the cam may all be mounted in parallel planes, as seen in the drawings.

We claim—

1. In a steering mechanism, the combination of a guiding or steering member, a movable toothed member connected therewith, a substantially flat cam engaged with said toothed member and having an acting portion in the form of one or more complete turns of a spiral or scroll, said cam being capable of making one or more complete rotations in engagement with the toothed member, its acting portion remaining substantially normal to the path of the scroll-engaging part of the toothed member, whereby the toothed member is locked against movement when the cam is stationary, and means to rotate the scroll and thereby move the toothed member.

2. A steering mechanism comprising a spindle adapted to be connected with the steering-handle, an oscillatory lever adapted to be connected with the guiding member or members, a substantially flat rotary cam engaged with said lever and adapted when rotated to oscillate the lever, and when stationary to lock the lever against movement, and multiplying-gearing interposed between said cam and said spindle.

3. A steering mechanism comprising a spindle adapted to be connected with the steering-handle, an oscillatory lever adapted to be connected with the guiding member or members, a substantially flat rotary cam engaged with said lever and adapted when rotated to oscillate the lever and when stationary to lock the lever against movement, and multiplying spur-gearing interposed between said cam and said spindle, said spur-gearing, cam, and lever being mounted to rotate in parallel planes.

In testimony whereof we have affixed our signatures in presence of two witnesses.

FREDERICK E. ALLEN.
RAYMOND H. DANFORTH.

Witnesses:
C. F. BROWN,
A. D. HARRISON.